United States Patent
Perego

(10) Patent No.: US 11,098,743 B2
(45) Date of Patent: Aug. 24, 2021

(54) SCREWS WITH SOCKET HEAD

(71) Applicant: FONTANA FASTENERS R.D. S.r.l., Veduggio Con Colzano (IT)

(72) Inventor: Francesco Perego, Merate (IT)

(73) Assignee: FONTANA FASTENERS R.D. S.r.l., Veduggio con Colzano (IT)

( * ) Notice: Subject to any disclaimer, the term of this patent is extended or adjusted under 35 U.S.C. 154(b) by 113 days.

(21) Appl. No.: 16/334,392

(22) PCT Filed: Oct. 2, 2017

(86) PCT No.: PCT/IB2017/056061
§ 371 (c)(1),
(2) Date: Mar. 19, 2019

(87) PCT Pub. No.: WO2018/065877
PCT Pub. Date: Apr. 12, 2018

(65) Prior Publication Data
US 2019/0219088 A1    Jul. 18, 2019

(30) Foreign Application Priority Data

Oct. 4, 2016  (IT) .................. 102016000099434

(51) Int. Cl.
*F16B 35/06* (2006.01)
*F16B 23/00* (2006.01)

(52) U.S. Cl.
CPC .................. *F16B 23/003* (2013.01)

(58) Field of Classification Search
CPC .................................................. F16B 23/003
(Continued)

(56) References Cited

U.S. PATENT DOCUMENTS 3,187,790 A * 6/1965 Wing .................... B25B 15/005
81/460
5,577,871 A * 11/1996 Brugola .............. F16B 23/0092
411/404
(Continued)

FOREIGN PATENT DOCUMENTS

CN       102536990 A   7/2012
DE       92 03 586 U1  5/1992
(Continued)

OTHER PUBLICATIONS

Communication dated Oct. 12, 2020 from the Chinese Patent Office in Application No. 201780060957.7.
(Continued)

*Primary Examiner* — Gary W Estremsky
(74) *Attorney, Agent, or Firm* — Sughrue Mion, PLLC

(57) ABSTRACT

Screws are provided which have a longitudinal axis and include a threaded shank and a head wherein a socket is formed to be engaged by a wrench and having a pluri-lobed outer profile comprising a series of lobes circumferentially offset and separated by a series of circumferentially offset protrusions of the head. Each protrusion is delimited by two flanks and a front length joining the radially inner ends of the flanks and is convex and symmetrical with respect to a center axis radially oriented with respect to the longitudinal axis. The front length is formed by a center face and two inclined side faces each of which joins the radially inner end of the respective flank with a respective end of the center face, which is oriented orthogonally with respect to the center axis of the protrusion. Pluri-lobed wrenches adapted for use with such screws are also provided.

7 Claims, 1 Drawing Sheet

(58) Field of Classification Search
USPC .......................................................... 411/403
See application file for complete search history.

(56) References Cited

U.S. PATENT DOCUMENTS

| | | | | |
|---|---|---|---|---|
| 6,158,310 | A * | 12/2000 | Goss | F16B 23/003 |
| | | | | 81/121.1 |
| 6,626,067 | B1 * | 9/2003 | Iwinski | B25B 13/065 |
| | | | | 411/403 |
| 6,997,085 | B2 * | 2/2006 | Yamamoto | B25B 13/06 |
| | | | | 411/402 |
| 9,422,965 | B2 * | 8/2016 | Campbell, II | F16B 23/0007 |
| 2012/0137842 | A1 | 6/2012 | Guo et al. | |
| 2013/0011216 | A1 * | 1/2013 | Frank | F16B 23/003 |
| | | | | 411/403 |
| 2013/0068075 | A1 * | 3/2013 | Stiebitz | B25B 13/065 |
| | | | | 81/460 |
| 2015/0266169 | A1 * | 9/2015 | Campbell, II | B21K 1/463 |
| | | | | 81/436 |

FOREIGN PATENT DOCUMENTS

| | | |
|---|---|---|
| EP | 1693577 A1 | 8/2006 |
| EP | 2441971 A1 | 4/2012 |
| JP | 2007205553 A | 8/2007 |
| JP | 5155888 B2 | 3/2013 |

OTHER PUBLICATIONS

Communication dated Apr. 23, 2021 in Indian Application No. 201917016960.

* cited by examiner

SCREWS WITH SOCKET HEAD

CROSS-REFERENCE TO RELATED APPLICATIONS

This application is a National Phase Application of PCT International Application No. PCT/IB2017/056061, International Filing Date, Oct. 2, 2017, claiming priority to Italian Patent Application No. 102016000099434, filed Oct. 4, 2016 each of which is hereby incorporated by reference in its entirety.

FIELD OF THE INVENTION

The present invention relates to a screw with a socket head.

More specifically, such a screw has a longitudinal axis and comprises a threaded shank and a head in which a socket is formed to be engaged by a wrench and having a pluri-lobed outer profile comprising a series of lobes circumferentially offset and separated by a series of circumferentially offset protrusions of said head. Each protrusion is delimited by two flanks and a front length joining the radially inner ends of the flanks and is convex and symmetrical with respect to a center axis radially oriented with respect to said longitudinal axis.

BACKGROUND OF THE INVENTION

U.S. Pat. No. 5,577,871 describes a screw of the type described above, which may be tightened with a special pluri-lobed wrench, with a profile complementary to that of the socket of the screw head, or with a conventional polygonal wrench.

However, such a known screw cannot be tightened in an "efficient" way and without tightening-induced deformations, which in the field of application compromise the possibility of multi-tightening with wrenches other than those indicated above. Moreover, tightening with a hexagonal wrench may still to cause a deformation of the socket and thus reduce the efficiency of such operation with respect to the case wherein the special pluri-lobed wrench with a complementary profile is used.

EP 2 441 971 A1 describes a screw having the features indicated in the preamble of claim 1, wherein the front length of each protrusion is composed of two inclined side faces that meet at a center edge.

US 2012 137842 A1 describes a socket head screw with an external pluri-lobed profile, whereby the lobes are separated by concave protrusions.

EP 1 693 577 A1 describes a screw with a head wherein Y-shaped grooves are formed.

SUMMARY OF THE INVENTION

An object of the present invention is therefore to remedy the aforementioned drawbacks of the prior art.

According to the present invention, such purposes are achieved by screws having the features described and claimed herein.

In addition to using a specific wrench with a profile complementary to that of the related socket, the screw of the invention may also be tightened with a known pluri-lobed wrench of the "Torx"® type or a conventional polygonal wrench, thus guaranteeing a remarkable versatility of use and an equal, if not increased, "tightening efficiency" in accordance with existing standards (e.g. ISO 4762 and ISO 14579) that provide dimensions of the socket for a given class of screws.

If the specific wrench with a complementary profile is used, the tightening of screw of the invention is carried out with increased efficiency. In this way, with the same screwing torque imposed, there is less deformation of the imprint of the screw's socket, which translates into a greater axial load (or "pull") of the same screw. The Cartesian torque/screw angle diagram, inherent to the screw of the invention, has a linear length with greater slope and a limit of linearity at a higher value of transmitted torque without causing undesirable nonlinear deformations with respect to the known socket screws mentioned above.

The screw of the invention also has the advantage of having a reduced mass with respect to the known screws with a pluri-lobed cavity, due to the fact that each protrusion has a front length with a center "flush" face, which does not diminish the efficiency of the tightening, lying in a plane orthogonal to a radial plane passing through the longitudinal axis of the screw and the center line of the aforementioned center face. The latter face allows an optimal insertion of the three possible wrenches mentioned above, in particular the hexagonal wrench. The insertion into the socket of this latter wrench is in fact facilitated as there is no longer the edge joining the inclined faces of the ridges interposed between the lobes of the socket of the screw claimed by U.S. Pat. No. 5,577,871.

Another subject-matter of the present invention is a pluri-lobed wrench having an external profile complementary to the profile of the socket of the head of the screw of the invention.

Further advantages and features of the present invention will become apparent from the detailed description that follows, provided by way of non-limiting examples with reference to the drawings.

DETAILED DESCRIPTION

Figure 1:
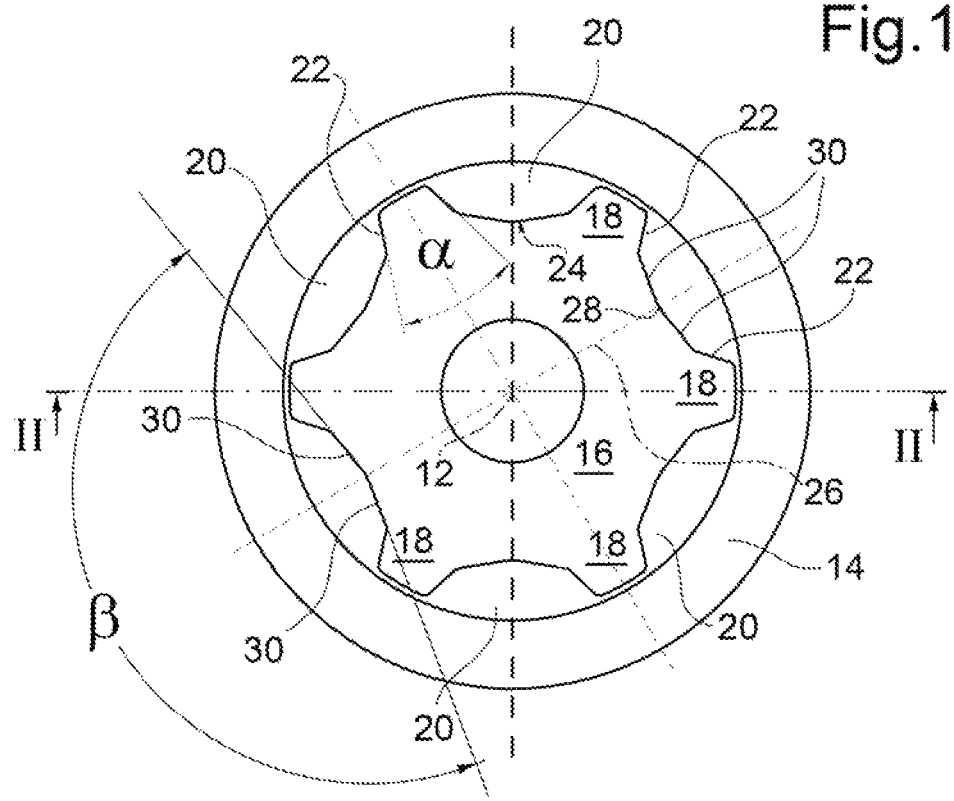
FIG. 1 is a schematic plan view of a screw of the invention.
Figure 2:
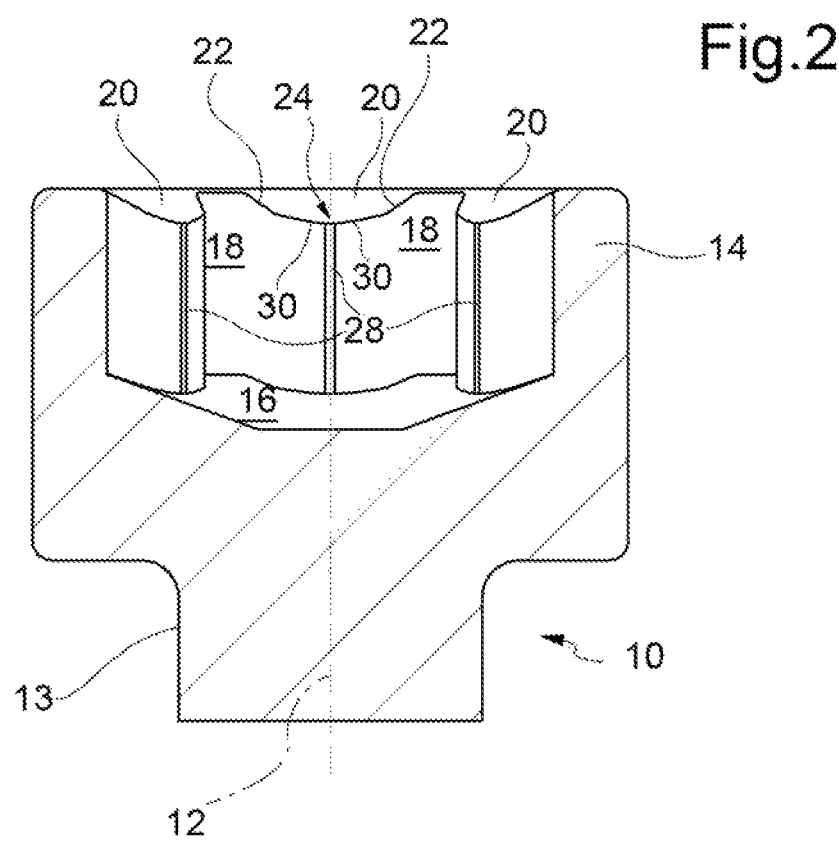
FIG. 2 is a sectional view according to the line II-II of FIG. 1.

A screw 10 has a longitudinal axis 12 and comprises a threaded shank 13 and a head 14 within the center portion of which a socket 16 is provided open outwardly and intended to be engaged by a tightening tool such as a wrench.

The socket 16 has a pluri-lobed external profile comprising a series of lobes 18 circumferentially offset and separated by a series of circumferentially offset protrusions 20 of the head 14. The lobes 18 and the protrusions 20 are six and equally spaced, but, in embodiments not illustrated, could be present in any whole number ranging from 2 to 12.

Each protrusion 20 is delimited by two flanks 22 and a front length 24 joining the radially inner ends of the flanks 22 and is convex and symmetrical with respect to a center axis 26, radially oriented with respect to the longitudinal axis 12 of the screw 10. The top surface of the protrusions 20 is further inclined towards the bottom of the socket 16 proceeding radially inward. It goes without saying, moreover, being that every protrusion 20 is convex, every segment joining any two points of the respective top surface is entirely contained in this latter surface.

The front length 24 of each protrusion 20 is formed by a center face 28 and two side faces 30, inclined with respect to the axis 26, each of which joins the radially inner end of the respective flank 22 with a respective end of the center face 28, which is oriented orthogonally with respect to the center axis 26.

The two inclined side faces 30 of each front length 24 form an angle β between 155° and 174°, and preferably 162°. The center face 28 and the side faces 30 are flat and intersect, forming respective edges.

The facing flanks 22 of two consecutive protrusions 20 form an angle α in the range of 25° to 45°, and preferably 34.8°.

Advantageously, the ratio between the length of the center face 28 and the distance between the radially inner ends of the flanks 22 of each protrusion 20 is between 0.01 and 0.8.

The edges joining respectively the radially inner end of each flank 22 with the associated inclined side face 30 and the radially outer end of each flank 22 with the bottom of the adjacent lobe 18 are rounded.

The screw 10 just described may be tightened not only with a specific wrench with a profile complementary to that of the socket 16, but also with a known, "Torx"®-type pluri-lobed wrench and a conventional hexagonal wrench, having the advantages described above.

Naturally, the principle of the invention remaining the same, details of construction and embodiments may be varied with respect to those described herein, which have been given purely by way of non-limiting example, without thereby departing from the scope of the invention as described herein.

The invention claimed is:

1. A screw having a longitudinal axis comprising a threaded shank and a head within which is formed a socket configured to be engaged by a wrench and having a pluri-lobed external profile comprising a series of lobes circumferentially offset and separated by a series of circumferentially offset protrusions of said head, each protrusion being delimited by two flanks and a front length joining the radially inner ends of said flanks and being convex and symmetric with respect to a center axis radially oriented with respect to said longitudinal axis, wherein the front length of said screw is formed by a center face and two inclined side faces each of which joins the radially inner end of the respective flank with a respective end of the center face which is orthogonally orientated with respect to said center axis of the protrusion, and wherein the ratio between the length of said center face and the distance between the radially inner ends of said flanks is in the range 0.01 to 0.8.

2. The screw of claim 1, wherein said two inclined side faces form an angle in the range 155° to 174°.

3. The screw of claim 1, wherein the facing flanks of two consecutive protrusions form an angle in the range 25° to 45°.

4. The screw of claim 1, wherein said lobes and said protrusions are six in number and equi-spaced.

5. The screw of claim 1, wherein a top surface of each of the protrusions is inclined towards a bottom of the socket proceeding radially inward.

6. The screw of claim 1, wherein the center face and the side faces of the frontal portion of each protrusion are flat and intersect, forming respective edges.

7. A pluri-lobed wrench having an external profile which is complementary to the profile of the socket of the head of a screw according to claim 1.

* * * * *